US008409681B2

(12) United States Patent
Garoff et al.

(10) Patent No.: US 8,409,681 B2
(45) Date of Patent: *Apr. 2, 2013

(54) MULTI-STAGE PROCESS FOR PRODUCING MULTI-MODAL LINEAR LOW DENSITY POLYETHYLENE

(75) Inventors: Thomas Garoff, Helsinki (FI); Paivi Waldvogel, Porvoo (FI); Kalle Kallio, Porvoo (FI); Virginie Eriksson, Stenungsund (SE); Aki Aittola, Vasterskog (FI); Esa Kokko, Vantaa (FI)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/126,496

(22) PCT Filed: Feb. 22, 2010

(86) PCT No.: PCT/EP2010/052172
§ 371 (c)(1),
(2), (4) Date: Jul. 13, 2011

(87) PCT Pub. No.: WO2010/097351
PCT Pub. Date: Sep. 2, 2010

(65) Prior Publication Data
US 2011/0263801 A1  Oct. 27, 2011

(30) Foreign Application Priority Data
Feb. 24, 2009 (EP) .................... 09153510

(51) Int. Cl.
*B32B 1/08* (2006.01)
*C08F 2/14* (2006.01)
*C08F 2/34* (2006.01)
*C08F 210/14* (2006.01)
*C08F 4/685* (2006.01)

(52) U.S. Cl. ...... 428/36.9; 526/65; 526/116; 526/348.3; 526/348.5; 526/348.6; 526/352.2

(58) Field of Classification Search .................... 526/65, 526/116, 348.5, 348.6, 352.2, 348.3; 428/36.9
See application file for complete search history.

(56) References Cited

U.S. PATENT DOCUMENTS

| 3,242,150 | A | | 3/1966 | Scoggin |
| 3,374,211 | A | | 3/1968 | Marwil et al. |
| 3,405,109 | A | | 10/1968 | Rohlfing |
| 4,582,816 | A | | 4/1986 | Miro |
| 5,391,654 | A | | 2/1995 | Ahvenainen et al. |
| 6,552,150 | B1 | * | 4/2003 | Nummila-Pakarinen et al. .............. 526/352 |
| 6,573,343 | B1 | * | 6/2003 | Follestad .............. 526/65 |
| 6,632,680 | B1 | | 10/2003 | DesLauriers et al. |

FOREIGN PATENT DOCUMENTS

| EP | 0 479 186 | 3/1995 |
| EP | 0 707 513 | 9/1998 |
| EP | 0 891 990 | 9/2004 |
| EP | 1 484 343 | 12/2004 |
| EP | 1 591 460 | 6/2006 |
| EP | 1 780 225 | 5/2007 |
| EP | 1 310 295 | 7/2007 |
| EP | 1 860 125 | 11/2007 |
| EP | 1 415 999 | 12/2007 |
| EP | 2 030 991 | 3/2009 |
| EP | 1 633 466 | 3/2010 |
| WO | WO 97/04015 | 2/1997 |
| WO | WO 01/00685 | 1/2001 |
| WO | WO 2004/055068 | 7/2004 |
| WO | WO 2006/014475 | 2/2006 |
| WO | WO 2007/051607 | 5/2007 |

OTHER PUBLICATIONS

International Search Report mailed Jun. 25, 2010 for International application No. PCT/EP2010/052172.
Written Opinion mailed Jun. 25, 2010 for International application No. PCT/EP2010/052172.
Response to Written Opinion dated Dec. 22, 2010 for International application No. PCT/EP2010/052172.
International Preliminary Report on Patentability mailed Feb. 3, 2011 for International application No. PCT/EP2010/052172.
McAuley, K.B. et al., *On-Line Interference of Polymer Properties in an Industrial Polyethylene Reactor*, AIChE Journal, Jun. 1991, vol. 37, No. 6, pp. 825-835.
Deslauriers, Paul J., *Quantifying short chain branching microstructures in ethylene 1-olefin copolymers using size exclusion chromatography and Fourier transform infrared spectrocsopy (SEC-FTIR)*, Elsevier, Polymer 2002, pp. 159-170.
McAuley, K.B., *Modeling Estimation and Control of Product Properties in a Gas Phase Polyethylene Reactor*, McMaster University, Open Access Dissertations and Theses, Paper 4105, 1991.
Hagstrom, B., *Prediction of melt flow rate (MFR) of bimodal polyethylenes based on MFR of their components*, in: Conference on Polymer Processing (The Polymer Processing Society), Extended Abstracts and Final Programme, Gothenburg, Aug. 19-21, 1997, 4:13.

* cited by examiner

*Primary Examiner* — Fred M Teskin
(74) *Attorney, Agent, or Firm* — Fay Sharpe LLP

(57) ABSTRACT

A process is disclosed for producing a multi-modal linear low density polyethylene in at least two staged reactors connected in series, comprising (i) polymerizing in a first slurry phase stage ethylene monomers with a Ziegler-Natta polymerization catalyst system to obtain a first polyethylene fraction component (A); and (ii) polymerizing in a second gas or slurry phase stage ethylene monomers with a Ziegler-Natta polymerization catalyst system to obtain a second polyethylene fraction component (B). The Ziegler-Natta polymerization catalyst system comprises: 1) a solid procatalyst formed by contacting at least: a) a Mg-alcoholate complex of formula (I) b) an aluminum compound of formula (II); and c) a vanadium compound and a titanium compound having a molar ratio (V:Ti) from 10:90 to 90:10; and 2) one or more organometallic cocatalysts of formula (III). The linear low density polyethylene shows an improved comonomer composition distribution Formulas (I), (II), and (III) are described herein.

19 Claims, 1 Drawing Sheet

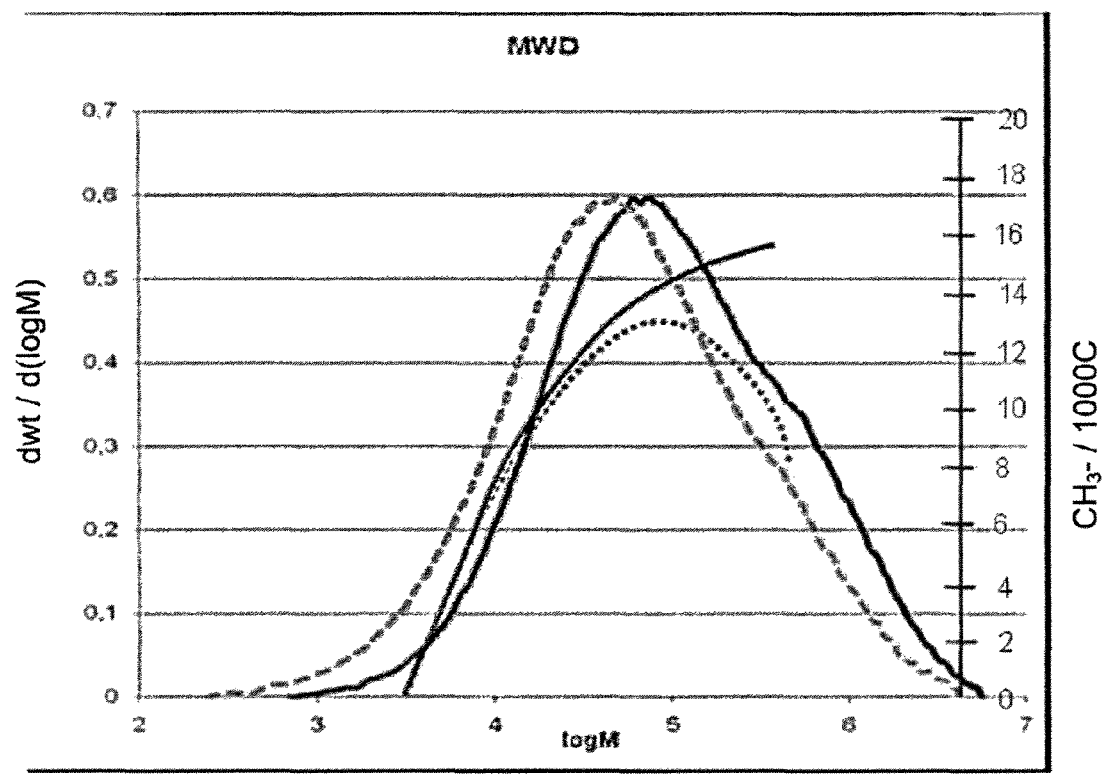

MULTI-STAGE PROCESS FOR PRODUCING MULTI-MODAL LINEAR LOW DENSITY POLYETHYLENE

BACKGROUND

The present invention relates to an improved multi-stage process for producing multi-modal, preferably bimodal linear low density polyethylene (LLDPE) in the presence of an improved solid vanadium-containing Ziegler-Natta catalyst system, to LLDPE compositions obtainable by this process showing improved comonomer composition distribution and to articles manufactured therefrom.

One of the main challenges when producing linear low density polyethylene (LLDPE) grades in full scale is the formation of chunks, lumps and sheeting. These problems are very pronounced when using a conventional Ziegler-Natta type of catalyst. One of the main reasons is the poor comonomer composition distribution of such catalysts, i.e. the problem in copolymerizing ethylene with $C_3$- to $C_{10}$-alpha-olefins in the presence of conventional types of Ziegler-Natta catalyst compositions is, that the comonomers tend to be irregularly distributed over the molecule chains yielding copolymers with uneven or poor comonomer composition distribution (CCD), which can be detected for example by TREF (temperature rising elution fractionation) method, Differential Scanning calorimetry (DSC), GPC-FTIR (Gel Permeation Chromatography coupled with Fourier transform infrared spectroscopy instruments) or measuring the amount of xylene soluble polymer fraction.

A further problem that is often encountered with the prior art catalysts is that it is difficult to produce an ethylene copolymer having a very high molecular weight and a low density. Especially this problem is apparent when producing a bimodal ethylene copolymer, where, for instance, in a first stage a low molecular weight copolymer component is produced in the presence of a high concentration of hydrogen. The polymer produced in the first stage is then directed to a second polymerization stage to produce the high molecular weight copolymer component, in the presence of the low molecular weight copolymer component. At this stage the concentration of hydrogen needs to be low. Unfortunately a small stream of hydrogen is carried over from the first polymerization stage to the second polymerization stage. If the catalyst is very sensitive to hydrogen, like some single site catalysts, then the molecular weight of the polymer component produced in the second stage is reduced by the hydrogen carried over from the first polymerization stage. This makes it impossible to produce bimodal ethylene copolymers having a high weight average molecular weight and a low density with good CCD.

As is also known in the art, conventional ZN catalysts tend to produce ethylene polymers having broad molecular weight distributions.

The broadness of a MWD may be described by the ratio of the weight average molecular weight (Mw) and the number average molecular weight (Mn). A high value of Mw/Mn (MWD) indicates a broad molecular weight distribution.

Polyethylene requires for certain applications a bimodal distribution of molecular weight in order to yield optimal structural characteristics and physical properties. This can be achieved by ensuring that the polyethylene contains a component having a lower molecular weight (LMW component) and a component having a higher molecular weight (HMW component). The lower molecular weight mode imbues the final polymer with the desired processability, whilst the higher molecular weight mode imbues the product with the necessary durability and hardness.

When conventional ZN catalysts are used to produce bimodal polymers both the lower and the higher molecular weight components tend to have a broad MWD. In particular the HMW components tend to have significant lower molecular weight "tails" which have deleterious affects on the mechanical properties of the polymer and on articles made from the polymer.

To solve these problems metallocene catalysts (single site catalysts) have been used, which have a very narrow molecular weight distribution, very controlled active site structure and copolymerize comonomers only into the higher molecular weight part, leading to very narrow composition distributions in slurry and gas phase conditions, minimizing the effect of improper low density low molecular weight polymers. These copolymers, of the same chemical composition, are endowed with superior properties as compared with traditional copolymers. Such single site catalyst systems, employing organometallic compounds and aluminoxane, can provide improved control of MWD and branching compositional distributions compared to traditional Ziegler-Natta catalyst systems.

However, the solubility of organometallic compounds and cocatalysts such as methylaluminoxane (MAO) requires immobilization processes on inorganic supports in systems that are costly. Accordingly, it can be difficult to apply single site catalysts in existing polymerization processes without major process modification and capital investments. So the application of such systems for producing LLDPE has its drawbacks. Also, if the catalyst is very sensitive to hydrogen, as many single site catalysts are, then, as stated above, the molecular weight of the polymer component produced in the second stage is reduced by the hydrogen carried over from the first polymerization stage. This makes it difficult to produce bimodal ethylene copolymers having a high weight average molecular weight and a low density with good CCD with single site catalysts.

Hence, there is still a need for improved processes which avoid the disadvantages and lacks in well-known multi-stage processes using conventional Ziegler-Natta (ZN) and single site (SS) catalyst systems and provide bimodal LLDPE having a narrow molecular weight distribution and improved comonomer composition distribution and thus overcome known problems of ZN- and SS-catalyst systems.

Several multistage processes using different ZN-catalysts have been described in the literature.

For example WO 2006/014475 describes a process for producing an ethylene polymer composition in a multistage process, wherein in the first stage ethylene is polymerized alone or with a comonomer to produce ethylene polymer, transferring the polymer produced in the first stage into a second stage, in which ethylene is polymerized alone or with a comonomer, in the presence of the polymer produced in the first stage. The first stage is a slurry polymerization stage and the polymerization is carried out in the presence of a catalyst system comprising:

a) a solid catalyst precursor, comprising a transition metal selected from titanium and vanadium; magnesium; a halide; optionally an electron donor; and a solid particulate material comprising an inorganic oxide, wherein the median particle diameter of the solid precursor, $D_{50}$, is from 1 to 13 micrometers; and b) an organoaluminium compound.

By using this catalyst system the gel levels in ethylene polymer compositions produced in a multistage process, wherein the first stage is carried out in a slurry reactor, should be reduced. Preferably the second stage is also a slurry polymerization.

The preferred catalyst precursor used according to WO 2006/014475 has the formula $Mg_aTi(OR)_bX_c(ED)_d$ wherein R is an aliphatic or aromatic hydrocarbon radical having 1 to 14 carbon atoms or COR', wherein R' is an aliphatic or aromatic hydrocarbon radical having 1 to 14 carbon atoms; each OR group is the same or different; each X is independently Cl, Br or iodine; ED is an electron donor; a is 0.5 to 56; b is 0, 1 or 2; c is 2 to 116 and d is less than or equal to 1.5a+4.

However WO 2006/014475 does not disclose the possibility of narrowing the molecular weight distribution of a bimodal ethylene polymer and improving the comonomer composition distribution by using special ZN-catalysts.

WO 2007/051607 describes the use of a modified ZN-catalyst system for tailoring the properties of a multimodal ethylene polymer to influence the molecular weight distribution (MWD) of a higher molecular weight (HMW) component whilst essentially having no effect on the MWD of the lower molecular weight (LMW) component.

The multimodal (e.g. bimodal) ethylene polymers having a LMW component and a HMW component are produced by polymerizing ethylene and optionally at least one further alpha olefin in at least two stages, wherein at least one stage is carried out in a slurry in the presence of a Ziegler-Natta catalyst comprising an electron donor that is an ether. The resulting ethylene polymer produced according to WO 2007/051607 in a full scale two stage polymerization process preferably has a $MFR_2$ of 10 to 1000 g/10 min measured according to ISO 1133 at 190° C. and under 2.16 kg load and can be used for the manufacture of films and pipe.

None of these literatures suggests the possibility of using a vanadium-containing Ziegler-Natta catalyst system in a multistage process which enables to improve the CCD, to narrow the MWD and which is also active in the presence of hydrogen, allowing the desired HMW component (lower $MFR_2$) to be achieved in the later polymerization step. Furthermore there is no disclosure to tailor the placement of comonomer into the high molecular weight fraction of the polymer and also to tailor the molecular weight profile of the high molecular weight fraction of the polymer.

Therefore there is still a need for a process which provides multi-, preferably bimodal linear low density polyethylene with controllable molecular weight distribution as well as comonomer composition distribution even when hydrogen is present.

In particular a process which produces multi-, preferably bimodal polymers having a narrow MWD, improved CCD and a higher molecular weight component without a significant lower molecular weight tail, but presence of a high molecular weight tail is desired.

BRIEF DESCRIPTION

Thus viewed from a first aspect the invention provides multi-stage polymerization process for the production of a multi-modal linear low density polyethylene in at least two staged reactors connected in series comprising at least
(i) polymerizing in a first slurry phase stage ethylene monomers and optionally one or more alpha-olefine comonomers, in the presence of a Ziegler-Natta polymerization catalyst system to obtain a first polyethylene fraction component (A)
(ii) polymerizing in a second gas or slurry phase stage ethylene monomers and one or more alpha-olefine comonomers, in the presence of a Ziegler-Natta polymerization catalyst system to obtain a second polyethylene fraction component (B),
one of fraction component (A) or (B) being a lower molecular weight component of the linear low density polyethylene, the other being a higher molecular weight component of the linear low density polyethylene,
wherein the second polymerization step is carried out in the presence of the polymerization product of the first polymerization step,
whereby the Ziegler-Natta polymerization catalyst system comprises
1) a solid procatalyst formed by contacting at least:
  a) a Mg-alcoholate complex of the formula (I):
    $Mg(OR_1)_{2-n}(R_1)_n$, wherein each $R_1$ independently represents a $C_1$-$C_{20}$ hydrocarbyl group and $0 \leq n < 2$ and may or may not be an integer;
  b) an aluminium compound of the formula (II)
    $Al(R_2)_mX_{3-m}$, wherein each $R_2$ independently represents an alkyl of up to 6 carbon atoms; each X is independently a halogen; $0 \leq m < 3$ and m and may or may not be an integer
  c) a vanadium compound and a titanium compound in portions such as to provide a molar ratio of V:Ti from 10:90 to 90:10
in order to yield the solid procatalyst and
2) one or more organometallic cocatalyst(s) of the formula (III)

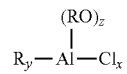

wherein each R is independently a $C_1$-$C_{20}$-alkyl group, $0 \leq x \leq 2$; $1 \leq y \leq 3$; $0 \leq z \leq 2$ and $x+y+z=3$; x, y and z may or may not be an integer,
yielding a multi-modal linear low density polyethylene with a narrow molecular weight distribution, measured with GPC, below 20, a density according to ISO 1183 of 900 to 935 kg/m³, an $MFR_{21}$ according to ISO 1133 (190° C., 21.6 kg load) of 1 to 15 g/10 min and a $C_3$-$C_{12}$-comonomer content of 1 to 15 wt %,
whereby the linear low density polyethylene shows an improved comonomer composition distribution compared to linear low density polyethylene produced with multistage processes using Ziegler-Natta catalysts with 100% Ti.

Viewed from a further aspect the invention provides multi-, preferably bimodal LLDPE polymers obtainable by the method as herein described.

Viewed from a yet further aspect the invention provides use of the multi-, preferably bimodal LLDPE polymers as hereinbefore described for the manufacture of articles, especially of films and pipes.

BRIEF DESCRIPTION OF THE DRAWING

The drawing is a graph of showing the GPC and GPC-FTIR curves of Example 3 and Comparative Example 3.

DETAILED DESCRIPTION

As used herein the term "multi-modal" or "bimodal" is intended to cover polymers having at least two differently centred maxima along the x-axis of their molecular weight distribution curve as determined by gel permeation chromatography (GPC). In such a curve d(log(MW)) is plotted as ordinate against log (MW), where MW is molecular weight.

The terms higher and lower molecular weight components are used herein to indicate that one component of the polymer has a higher molecular weight than the other component. The HMW component has a higher molecular weight than the LMW component, i.e. the terms HMW and LMW are relative.

It has been found that the process of the invention allows for the production of multi-, preferably bimodal LLDPE the properties of which can be "tailored" and "fine tuned" by the use of the special ZN catalyst composition of the invention. In particular, the combination of the multi-, preferably two-stage process and the special ZN-catalyst composition allows for the production of multi-, preferably bimodal LLDPE with improved properties such as an improved comonomer composition distribution, narrow MWD and improved bulk density of polymer powder in combination with the presence of a higher molecular weight component without a significant lower molecular weight tail, but with a high molecular weight tail.

The process of the invention may be used with particular advantage to tailor the distribution of molecular weights in the higher molecular weight fraction of the overall polymer. Moreover this may be done in such a way as to include comonomer (providing side chains and as a result increased strength) in the high molecular weight fraction. The presence of a multimodal, like bimodal distribution at the higher end of the molecular weights improves the ease of homogenization as the lower molecular weight component of the high molecular weight fraction reduces viscosity of the high molecular weight fraction.

Using the invention, the lower molecular weight fraction can be produced in the first stage, conveniently with little or no inclusion of comonomer, while a higher molecular weight fraction (with a sufficient relatively lower molecular weight component to prevent melt homogenization problems during subsequent processing and with an otherwise unacceptably high molecular weight higher molecular weight, strength giving, component) can be produced, generally with comonomer introduction, in a second stage or vice-versa.

Thus the process allows the user to tailor the placement of comonomer into the higher molecular weight fraction of the polymer and also to tailor the molecular weight profile of the higher molecular weight fraction of the polymer.

The polymer product has a high degree of particle to particle homogeneity. The homogeneity of the polymer is often a matter of particular concern to end users since inhomogeneity may give rise to phenomena known as fish eyes, gels or white spots.

Comonomer composition distribution (CCD) refers to the distribution of comonomer between copolymer molecules and the distribution of comonomer within each polymer molecule. CCD has effects on polymer properties, like crystallinity, optical properties, toughness, melt processability and many other properties as well.

The polymers which can be produced with the combination of the multi-stage process and the special ZN catalyst system according to the invention show an improved CCD compared to LLDPE produced by multi-stage processes using conventional Ziegler-Natta type catalysts with 100% titanium, thus containing no vanadium.

Especially MWD, comonomer composition distribution, density and $M_w$ are properties, which can be tailored by using the combination of the multi-stage process and the special ZN the catalyst system according to the invention.

The invention is based on the use of the combination of a multi-stage polymerization process and a special ZN catalyst system.

According to the invention an improved solid vanadium-containing Ziegler-Natta catalyst system is used for the multi-stage polymerization.

This improved solid Ziegler-Natta catalyst system comprises:
1) a solid procatalyst formed by contacting at least:
    a) a Mg-alcoholate complex of the formula (I):
        $Mg(OR_1)_{2-n}(R_i)_n$, wherein each $R_1$ independently represents a $C_1$-$C_{20}$ hydrocarbyl group and $0 \leq n < 2$ and may or may not be an integer;
    b) an aluminium compound of the formula (II)
        $Al(R_2)_m X_{3-m}$, wherein each $R_2$ independently represents an alkyl of up to 6 carbon atoms; each X is independently a halogen; $0 \leq m \leq 3$ and m and may or may not be an integer
    c) a vanadium compound and a titanium compound in portions such as to provide a molar ratio of V:Ti from 10:90 to 90:10
    in order to yield the solid procatalyst and
2) one or more organometallic cocatalyst(s) of the formula (III)

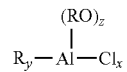

wherein each R is independently a $C_1$-$C_{20}$-alkyl group, $0 \leq x'2$; $1 \leq y \leq 3$; $0 \leq z \leq 2$ and $x+y+z=3$; x, y and z may or may not be an integer.

As stated above, solid procatalysts are formed by contacting at least a) a Mg-alcoholate complex of the formula (I), b) an aluminium compound of the formula (II) and c) a vanadium compound and a titanium compound.

For forming the solid procatalyst including preparing a special $MgCl_2$-carrier consisting of $MgCl_2$/Et-Al—(O—R)$_2$ as support, the method of contacting components a), b) and c) as described in WO2004/055068 is used.

According to this method the solid procatalyst is prepared by contacting
[A] a solid magnesium aluminium complex containing magnesium, halogen and aluminium with
[B] a vanadium compound and a titanium compound in portions such as to provide a molar ratio of V:Ti from 10:90 to 90:10

First the solid magnesium aluminium complex (=catalyst support) containing magnesium, halogen and aluminium is described below:

Said complex is obtained by
(a1) adding a solution of a magnesium compound of the formula (I):
    $Mg(OR_1)_{2-n}(R_1)_n$, wherein each $R_1$ independently represents a $C_1$-$C_{20}$ hydrocarbyl group and $0 \leq n < 2$ and may or may not be an integer;
    to a solution of a compound of formula (II): $Al(R_2)_m X_{3-m}$, wherein each $R_2$ independently represents an alkyl of up to 6 carbon atoms; X is independently a halogen; $0 \leq m < 3$ and m and may or may not be an integer
(a2) separating the solidified reaction product from the reaction mixture and washing the product with a wash solution until a molar ratio of aluminium to magnesium has a value of at least 0.3

Such complexes are known, for example from WO 2004/055068. Their preparation is done as described in WO 2004/055068.

The patent referred to in this specification is incorporated by reference herein.

Accordingly, the catalyst support prepared according to this method comprises a reaction product formed at least from:

1) Compound (1): A magnesium hydrocarbyloxy compound of a general formula (I):

$$Mg(OR_1)_{2-n}(R_1)_n,$$

wherein each $R_1$ is independently a $C_{1-20}$ hydrocarbyl group, e.g. a $C_{2-15}$ group, preferably a $C_{3-10}$ group, such as a $C_{4-10}$ group, suitably a $C_{4-10}$ group e.g. an alkyl, cycloalkyl, alkylcycloalkyl, cycloalkylalkyl, aryl, arylalkyl, or alkylaryl, wherein "alkyl" used as alone or as part of another option can be linear or branched and "aryl" is preferably of 5-12 carbon ring atoms, suitably phenyl or naphthyl; e.g. each $R_1$ is independently an ethyl, propyl, butyl, pentyl, hexyl, heptyl, octyl; and 0—n<2 and n may or may not be an integer.

In a preferred embodiment of the invention, a magnesium hydrocarbyloxy compound of formula $Mg(OR_1)_{2-n}(R_1)_n$ (I), wherein each $R_1$ is independently as defined above; is used, which may be commercially available or, preferably, is a reaction mixture of a magnesium alkyl compound of formula $Mg(R_1)_2$ (III), wherein each $R_1$ independently is as defined above, with an alcohol $R_1OH$, wherein $R_1$ is as defined above;

and

2) Compound (2): A halogen-containing compound of formula (II):

$$Al(R2)_mX_{3-m},$$

wherein each $R_2$ independently represents an alkyl of up to 6 carbon atoms, preferably up to 4 carbon atoms; and each X is independently a halogen, preferably a chlorine; 0≦m<3 and m may or may not be an integer; e.g. dialkyl aluminium chlorides, such as dimethyl aluminium chloride, diethyl aluminium chloride, diisobutyl aluminium chloride, or alkyl aluminium dichlorides, such as ethyl aluminium dichloride (EADC) or methyl aluminium dichloride;

Preferably, the support consists of the reaction product of compound (1), optionally prepared from compound (IV) and $R_1OH$ as defined above, and of compound (2).

A solution of the compound(s) (1) is added to the solution of compound(s) (2) to cause the solidification (precipitation) of the solid reaction product. A slowly addition under mixing is preferred. By slowly addition it is meant herein that the solution (1) is added gradually, e.g. drop wise or other similar means, to cause a uniform solidification reaction as known in the art.

A solution (1) containing a magnesium hydrocarbyloxy compound of formula $Mg(OR_1)_{2-n}(R_1)_n$ (I), wherein $R_1$ is as defined above; and 0≦n<2, is prepared first:

by contacting, in a hydrocarbon solvent (e.g. heptane), a compound of formula $Mg(R_1)_2$ (IV), wherein $R_1$ is as defined above under formula (I), e.g. each $R_1$ is independently methyl, ethyl, propyl, butyl, pentyl, hexyl, heptyl or octyl, e.g. di(n-butyl) magnesium, n-butyl sec-butyl magnesium, butyl ethyl magnesium or butyl octyl magnesium, preferably butyl octyl magnesium (BOMAG), with an alcohol of formula $R_1OH$, wherein $R_1$ is as defined above under formula (I), suitably a cycloalkyl, cycloalkylalkyl, aryl, alkylaryl, arylalkyl or alkyl, each containing from 2 to 15, preferably from 3 to 10 carbon atoms. Preferably $R_1$ is a $C_{3-15}$ cycloalkyl or branched or unbranched $C_{3-15}$ alkyl, preferably a $C_{4-10}$ cycloalkyl or a branched or unbranched $C_{4-10}$ alkyl, such as cyclopentanol, 2-methyl-2-propanol, 2-ethyl-1-butanol, 2-methyl-1-pentanol, 2-ethyl-pentanol, 2-ethyl-1-hexanol, n-heptanol, n-octanol and decanol, preferably 2-ethyl-1-hexanol. The alcohols which are usable to transform the magnesium hydrocarbyl to a magnesium hydrocarbyloxy complex soluble in a hydrocarbon solvent, are known in the art or can be readily determined by a skilled person. Said contact is effected in a temperature between 0 and 100° C., preferably at 10 to 40° C., e.g. at 20 to 30° C. The reaction can be completed by heating the system at 50 to 100° C. for 10 to 100 min. Preferably the alcohol is added to the Mg solution. The molar ratio of Mg dihydrocarbyl to $R_1OH$ (Mg:$R_1OH$) is preferably from 1:1 to 1:4, more preferably 1:1 to 1:3.5, e.g. 1:1.5 to 1:3.5, especially 1:1.8 to 1:3.1.

The solution (2) of the halogen-containing compound is prepared by dissolving in a hydrocarbon solvent as defined above (e.g. toluene) a compound of formula $$Al(R_2)_mX_{3-m} \qquad (II),$$

wherein each $R_2$ is independently as defined above, preferably an alkyl of up to 6, such as up to 4, carbon atoms; and each X is independently a halogen, such as chlorine; and x may of may not be an integer 0≦m<3; e.g. dimethyl aluminium chloride, diethyl aluminium chloride, diisobutyl aluminium chloride, ethyl aluminium dichloride and methyl aluminium dichloride, preferably ethyl aluminium dichloride (EADC). Such solutions may also be commercially available, whereby they may be further diluted, if desired, with a solvent as defined above.

The prepared reaction mixture (1), i.e. Mg-hydrocarbyloxy-containing solution (1), is then added slowly to the obtained Al solution (2).

It has been found that in order to achieve beneficial properties of the support material, the obtained solid reaction product should be recovered from the reaction mixture of solution (1) and (2) before the use as a support.

The recovery step can be effected in various ways including the separation of the solid reaction product from the liquid reaction medium, e.g. by filtration, decantation or suction, and washing the solid product with a wash solution e.g. in a manner known in the art, before it is used as a support material.

It is evident for a skilled person that the washing efficiency can be varied within the scope of the invention depending on the desired washing effect and can be controlled e.g. by the number of the washing steps, the temperature, the solvent(s) used for washing, the amount of the wash solution and the washing time. The wash temperature can be e.g. 0 to 100° C., suitably 20 to 100° C., e.g. 40 to 80° C., such as 55-70° C. Thus the duration of a washing (e.g. the mixing time of the slurry in a wash solution) depends on the desired effect and can be chosen accordingly. The washing effect depends on the separation efficiency of the solid material from the solution.

Solutions of the Starting Compounds:

The term "solution" is understood herein broadly to include solutions prepared from (a) one or more of the support forming compounds in liquid form (liquid at the room temperature or a melt prepared at a higher temperature) and/or (b) from an organic solvent(s).

The solutions are suitably formed using an organic solvent that dissolves the compounds. Preferred solvents include inert hydrocarbons, e.g. linear or branched aliphatic, alicyclic or aromatic $C_{6-20}$ hydrocarbons, preferably $C_{6-12}$ hydrocarbons, wherein the ring systems may contain hydrocarbon, e.g. $C_{1-6}$ alkyl substituents, such as cyclohexane, hexane, heptane, octane or toluene, or any mixtures thereof. E.g. linear or branched alkanes, e.g. hexane, heptane or octane, may be used.

Wash Solution:

As the wash solution, e.g. any organic solvent or mixtures thereof known in the art can be used. Preferable solvents include hydrocarbons as defined above, e.g. pentane, hexane or heptane, particularly heptane.

Further treatment steps of the solid reaction product may also be possible after the combination of solutions (1) and (2) (i.e. after the precipitation reaction) before or during the recovery step of the invention. Such treatment includes e.g. a heating step of the reaction mixture after the solidification at an elevated temperature, e.g. up to 100° C., such as 40 to 80° C., suitably 50 to 75° C., for a suitable period of time, such as from 5 minutes to 24 hours, e.g. 10 to 720 minutes, such as 20 to 360 minutes, before the recovery step.

In a preferable embodiment, the molar ratio of aluminium to magnesium in the catalyst support material of the invention is at least $0.3$ ($\geq 0.3$). Preferably the molar ratio of aluminium to magnesium is at least $0.4$ ($\geq 0.4$), or preferably at least $0.5$ ($\geq 0.5$), or at least of $0.6$ ($\geq 0.6$). Said ratios result in a catalyst with very good morphology and reduced amount of fines content of the produced polymer product. In a further embodiment of the invention said molar ratio may be even at least $0.7$ ($\geq 0.7$) or $0.80$ ($\geq 0.80$), such as $0.85$ ($\geq 0.85$), depending on the properties desired for the catalyst. In principle, the upper limit of said ratio range is not limited, but may be e.g. 1.1. In one preferred embodiment said upper limit of said molar ratio is 0.99. The above-said molar ratio can be determined in a known manner, e.g. using flame atomic absorption method with e.g. a nitrous oxide/acetylene flame.

The molar ratio of aluminium to magnesium in the support material is adjusted to a desired range by means of the recovery step of the invention, i.e. by separating the solids from the liquid reaction medium and by washing the solids as described above. Particularly, the obtained solid reaction product is washed with a wash solution, and the washing procedure can be repeated, if needed, until the desired ratio is obtained. The ratio can be monitored between the washings, if needed, e.g. by analysing the support samples in a conventional manner the relevant contents of the reaction product or the reaction medium, e.g. the mol-% of Mg and the mol-% of Al in the formed carrier material.

After the recovery step of the invention, the solid reaction product can be used as a support material for further catalytically active compounds, such as vanadium and titanium to form a final polymerization catalyst component, such as the solid ZN-procatalyst used according to the invention.

Accordingly, in the method for preparing the solid Ziegler-Natta procatalyst of the invention, the catalyst support, prepared as described above, is suspended in an organic solvent and treated with a vanadium compound and a titanium compound. The treatment step is preferably effected in a manner known in the art.

The vanadium compound employed for the preparation of the procatalyst is soluble in the liquid hydrocarbon and is, in general, a compound in which the vanadium has its maximum valency, that is to say valency 4, or else those in which the vanadyl group VO has its maximum valency, that is to say valency 3. The vanadium compound employed may be a compound which has either of the two general formulae $V(OR)_{4-m}X_m$ or $VO(OR)_{3-n}X_n$ in which formulae R denotes an alkyl group containing from 1 to 12 carbon atoms, X a halogen atom, such as bromine or chlorine, m an integral or fractional number ranging from 0 to 4 and n an integral of fractional number ranging from 0 to 3. Advantageously, one or more compounds can be employed, chosen from vanadium tetrachloride, vanadyl trichloride, vanadyl tri-n-propoxide, vanadyl triisopropoxide and vanadium tetra-n-propoxid. Preferably vanadium tetrachloride is used.

The titanium compound employed for the preparation of the procatalyst is also soluble in the liquid hydrocarbon and is, in general, a compound in which the titanium has its maximum valency, that is to say valency 4. The titanium compound employed may be a compound of the general formula $Ti(OR)_{4-p}X_p$ in which formula R denotes an alkyl group containing from 1 to 12 carbon atoms, X a halogen atom, such as bromine or chlorine, and p an integral or fractional number ranging from 0 to 4. Among these compounds, titanium tetrachloride or titanium tetraisopropoxide can be employed Preferably titanium tetrachloride is used.

The quantity of vanadium and titanium compound which are employed to prepare the procatalyst is in particular such that the molar ratio of V:Ti is from 10:90 to 90:10, preferably from 25:75 to 75:25, more preferably 40:60 to 60:40 and most preferably 50:50.

If it is referred to e.g. a 50/50% V/Ti catalyst, this means therefore 50/50 mol/mol V/Ti in the catalyst preparation step and not in the final catalyst.

Generally, in the final solid procatalyst particles, the molar ratio of Mg:(V+Ti) can be e.g. between 10:1 to 1:10, preferably less than 6:1, such as between less than 6:1 and 1:1.

The molar ratio of (V+Ti):Al can be e.g. between 10:1 to 1:2, e.g. 5:1 to 1:1. The ratios can be determined in a manner known in the art.

The final procatalyst, e.g. the ZN procatalyst, thus obtained is combined with further catalyst component(s) conventionally used in the art, such as a cocatalyst (e.g. aluminium alkyl compounds) and optionally (internal) electron donors, additional activators and/or modifiers. Said further catalyst component(s) can be combined with the present procatalyst during the preparation method of the present procatalyst or during the actual polymerization step by adding the procatalyst of the invention and the further component(s) separately into a reactor.

Preferably no internal electron donor is added.

Preferably the solid procatalysts have an average particles size in the range of 2 to 200 μm, more preferably from 5 to 150 μm and most preferably from 10 to 50 μm.

Cocatalyst:

The above described procatalyst is combined with a cocatalyst so that it can be used in the polymerization process according to the invention.

The cocatalyst is an organometallic compound of formula (III)

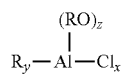

wherein each R is independently a $C_1$-$C_{20}$-alkyl group, $0 \leq x \leq 2$; $1 \leq y \leq 3$; $0 \leq z \leq 2$ and $x+y+z=3$, x, y and z may or may not be an integer;

Examples of suitable cocatalysts are:

Aluminium alkyls (x and z=0; y=3) like trimethyl aluminium, triethyl aluminium, triisobutylaluminium, tri-n-octyl aluminium and isoprenyl aluminium. Especially triethyl aluminium and/or triisobutylaluminium are preferred.

Aluminium alkyl halides (z=0; 0<x≦2; 1≦y<3) like diethyl aluminium chloride, ethyl aluminium dichloride, dipropyl aluminium chloride, propyl dibutyl aluminium chloride, butyl aluminium dichloride, methyl aluminium dichloride, dimethyl aluminium chloride Aluminium alkoxy compounds (0<z≦2, x=0; 1≦y<3) like diethyl aluminium ethoxide, diethyl aluminium propoxide, ethyl aluminium diethoxide, dipropyl aluminium ethoxide, di(iso)butyl aluminium ethoxide, (iso)butyl aluminium diethoxide, methyl aluminium propoxide, dimethyl aluminium ethoxide, or any combinations of alkyl and alkoxy groups.

Alternatively, the cocatalyst may be a mixture of compounds selected from the group consisting of tri-$C_1$-$C_{10}$ alkyl aluminium compounds, where one of the components comprises short-chained alkyl groups (1-3 carbon atoms) and the other component comprises long-chained alkyl groups (4-20 carbon atoms). Examples of suitable aluminium alkyls comprising short-chained alkyl groups are trimethyl aluminium and in particular, triethyl aluminium. Examples of suitable components comprising long-chained alkyl groups are tri-n-octyl aluminium and in particular isoprenyl aluminium. In particular, the cocatalyst is a mixture of isoprenyl aluminium and triethyl aluminium or isoprenyl aluminium and trimethyl aluminium.

In the ZN polymerization catalyst system used according to the present invention, the molar ratio between the aluminium in said cocatalyst and the vanadium+titanium of said procatalyst is preferably 1:1-100:1, more preferably 2:1-50:1 and most preferably 3:1-20:1.

The procatalyst and the cocatalyst may be contacted with each other prior to their introduction into the polymerization reactor. However, it is equally well possible to introduce the two catalyst components separately into the reactor.

It should be further mentioned that the special vanadium-containing Ziegler-Natta catalyst used according to the invention does not need any kind of promoter (like halogenated hydrocarbons).

As is known from the state of the art common vanadium-containing catalyst compositions include as an essential feature a promoter (like halogenated hydrocarbons) in order to increase the stability of these catalyst compositions.

A further embodiment of the present invention is the use of a solid Ziegler-Natta catalyst system comprising:
1) a solid procatalyst formed by contacting at least:
   a) a Mg-alcoholate complex of the formula (I):
      $Mg(OR_1)_{2-n}(R_1)_n$, wherein each $R_1$ independently represents a $C_1$-$C_{20}$ hydrocarbyl group and 0≦n<2 and may or may not be an integer;
   b) an aluminium compound of the formula (II)
      $Al(R_2)_m X_{3-m}$, wherein each $R_2$ independently represents an alkyl of up to 6 carbon atoms; each X is independently a halogen; 0≦m<3 and m and may or may not be an integer
   c) a vanadium compound and a titanium compound in portions such as to provide a molar ratio of V:Ti from 10:90 to 90:10
   in order to yield the solid procatalyst and
2) one or more organometallic cocatalyst(s) of the formula (III)

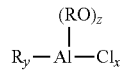

wherein each R is independently a $C_1$-$C_{20}$-alkyl group, 0≦x≦2; 1≦y≦3; 0≦z≦2 and x+y+z=3; x, y and z may or may not be an integer, in a multi-stage polymerization process to produce multi-modal linear low density polyethylene with a narrow molecular weight distribution, measured with GPC, below 20, a density according to ISO 1183 of 900 to 935 kg/m³, an $MFR_{21}$ according to ISO 1133 (190° C., 21.6 kg load) of 1 to 15 g/10 min, a bulk density of polymer powder, determined according to ASTM D1895-96, method A, of the LLDPE of above 300 kg/m³ and a $C_3$-$C_{12}$-comonomer content of 1 to 15 wt %, whereby the linear low density polyethylene has an improved comonomer composition distribution compared to linear low density polyethylene produced with Ziegler-Natta catalysts comprising 100% of titanium.

Polymerization Process

The catalyst systems hereinbefore described are according to the invention employed in a multi-stage, preferably two-stage polymerization. In such a polymerization the reactors are connected in series such that the products of one reactor are used as the starting material in the next reactor, with optional comonomer addition preferably in only the reactor(s) used for production of the higher/highest molecular weight component(s) or differing comonomers used in each stage.

A multistage process is defined to be a polymerization process in which a polymer comprising two or more fractions is produced by producing each or at least two polymer fraction(s) in a separate reaction stage, usually with different reaction conditions in each stage, in the presence of the reaction product of the previous stage. The polymerization reactions used in each stage may involve conventional ethylene homo-polymerization or copolymerization reactions, e.g. gas-phase, slurry phase, liquid phase polymerizations, using conventional reactors, e.g. loop reactors, gas phase reactors, batch reactors, e.t.c.

The polymerization may be carried out continuously or batch wise, preferably the polymerization is carried out continuously.

The polymer product of the first stage may be passed on to the subsequent (i.e. second) reactor on a continuous, semi-continuous or batch-wise basis.

The process according to the invention comprises preferably at least the steps of
(i) polymerizing in a first slurry phase stage ethylene monomers and optionally one or more alpha-olefine comonomers, in the presence of a Ziegler-Natta polymerization catalyst system to obtain a first polyethylene fraction component (A)
(ii) polymerizing in a second gas or slurry phase stage ethylene monomers and one or more alpha-olefine comonomers, in the presence of a Ziegler-Natta polymerization catalyst system to obtain a second polyethylene fraction component (B),
one of fraction component (A) or (B) being the lower molecular weight component of the linear low density polyethylene, the other being the higher molecular weight component of the linear low density polyethylene,
wherein the second polymerization step is carried out in the presence of the polymerization product of the first polymerization step.

If fraction component (A) is the lower molecular weight component of the linear low density polyethylene and fraction component (B) thus being the higher molecular weight component of the linear low density polyethylene, this is called normal mode.

On the contrary, if fraction component (A) is the higher molecular weight component of the linear low density polyethylene and thus fraction (B) being the lower molecular weight component of the linear low density polyethylene, this is called reverse mode.

Preferably the process according to the invention is run in the normal mode.

More preferably the production of fractions (A) and (B) is carried out as a combination of slurry polymerization for fraction (A) and gas phase polymerization for fraction (B).

Thus the first stage is carried out in the slurry phase and produces preferably the lower molecular weight component. The second stage can be carried out in a gas phase or in a slurry phase, but is preferably carried out in the gas phase. Preferably the second stage produces the higher molecular weight component. In a preferred polymerization process one slurry phase stage is followed by one gas phase stage.

The slurry and gas stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

Optionally the process according to the invention can comprise one or two additional polymerization steps.

These optional one or two additional polymerization steps preferably comprise gas phase polymerization steps.

The reactor system may additionally comprise other reactors, e.g. for pre-polymerization. Pre-polymerization may be used, for example, to provide the catalyst in a solid particulate form or to activate the catalyst. In a typical pre-polymerization, monomer (e.g. ethylene) is polymerized with catalyst, as hereinbefore described, to yield, for example, 0.1 to 1000 g polymer per gram of catalyst. The polymer formed during pre-polymerization forms less than 10% by weight, preferably less than 7% by weight, typically less than 5% by weight of the total weight of the final polymer. Still more preferably only 2-3% of the total weight of the polymer is formed during any pre-polymerization step. A pre-polymerization is therefore not intended to represent one of the stages of the multi-stage polymerization process hereinbefore described.

In a preferred method of the invention a bimodal LLDPE is produced in a two-stage process, whereby fraction (A) produced in the first slurry phase stage comprises 30 to 70% by weight, preferably 35 to 65% by weight of the total weight of the final polymer and is the LMW component.

This lower molecular weight component can contain some comonomer so that polymer density can be regulated in this first stage from 970 to 935.

The polymerization medium in the first stage typically comprises ethylene, optionally a comonomer, a diluent and catalyst as hereinbefore described. The diluent used will generally be an aliphatic hydrocarbon having a boiling point in the range −70 to +100° C. Preferred diluents include hydrocarbons such as propane, n-butane or isobutane, with propane as particularly preferred. Hydrogen is also preferably fed into the reactor to function as a molecular weight regulator. In a typical slurry phase polymerization the temperature is preferably in the range 40 to 110° C., preferably 60 to 100° C. and in particular 85 to 100° C. The reaction pressure is typically 10 to 150 bar, preferably 15 to 100 bar.

In some cases it may be preferred to conduct the polymerization at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture. When propane is used as a diluent an example of a suitable operating temperature is 95° C. and pressure 60 bar when employing supercritical conditions.

Polymerization in the first reactor (e.g. a loop reactor) is typically carried out for 10 to 180 minutes, preferably 20 to 90 minutes and the most preferably 30 to 60 minutes.

At least part of the volatile components of the reaction medium (e.g. hydrogen) may then be removed. The product stream is then subjected to a second polymerization stage.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

The second polymerization is preferably carried out using the same catalyst as hereinbefore described in the first stage (i.e. no fresh catalyst is added in the second stage).

In the second polymerization stage for producing bimodal LLDPE preferably the HMW component of the polyethylene copolymer is produced. The second stage is preferably carried out in the gas phase. The polymer produced in the second stage is preferably a copolymer. The polymer produced in the second stage preferably comprises 70 to 30%, preferably 65 to 35% by weight of the total copolymer composition (i.e. the LMW:HMW component weight ratio is preferably 30:70 to 70:30, preferably 35:65 to 65:35).

As gas phase reactors preferably fluidized bed gas phase reactors, fast fluidized bed gas phase reactors or settled bed gas phase reactors can be used.

Fluidized Bed Gas Phase Reactors:

In a fluidized bed gas phase reactor an olefin is polymerized in the presence of a polymerization catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are know by using common engineering practise. An overview is given, among others in Geldart: Gas Fluidization Technology, J.Wiley & Sons, 1986.

The reactor may also include a mechanical agitator to further facilitate mixing within the fluidized bed. An example of suitable agitator design is given in EP-A-707513.

Fast Fluidized Bed Reactor:

In such a reactor the velocity of the fluidization gas exceeds the onset velocity of pneumatic transport. Then the whole bed is carried by the fluidization gas. The gas transports the polymer particles to a separation device, such as cyclone, where the gas is separated from the polymer particles.

Settled Bed Reactor:

In the settled bed the polymer flows downward in a plug flow manner in an environment containing reactive components in gaseous phase. The polymer powder is introduced into the bed from the top from where it flows downwards due to gravity.

Polymerization in settled bed is disclosed, among others, in EP-A-1633466, EP-A-1484343 and WO-A-97/04015.

In the process according to the invention preferably a fluidized bed gas phase reactors is used for the second polymerization step.

For gas phase reactors used according to the invention, the reaction temperature used will generally be in the range 60 to 115° C. (e.g. 70 to 110° C.), the reactor pressure will generally be in the range 10 to 30 bar, and the residence time will generally be 0.5 to 8 hours. Preferably the residence time in the gas phase reactor is 1 to 4 hours, more preferably 1.5 to 3 hours.

The polymerization medium in the second stage typically comprises ethylene, comonomers (e.g. 1-butene, 1-hexene, or octene), nitrogen, propane and optionally hydrogen.

The properties of the fractions produced in the second step of the two-stage process can either be inferred from polymers, which are separately produced in a single stage by applying identical polymerization conditions (e.g. identical temperature, partial pressures of the reactants/diluents, suspension medium, reaction time) with regard to the stage of the two-stage process in which the fraction is produced, and by using a catalyst on which no previously produced polymer is present. Alternatively the properties of the second component can be derived from an analysis of the LMW component and the final polymer. Such calculations can be carried out using various techniques, e.g. K. B. McAuley: Modelling, Estimation and Control of Product Properties in a Gas Phase Polyethylene Reactor. Thesis, McMaster University, August 1991. or K. McAuley and J. McMacGregor, AlChE Journal, Vol. 37, no. 6, pages 825-835. B. Hagström: Prediction of melt flow rate (MFR) of bimodal polyethylenes based on MFR of their components, in: Conference on Polymer Processing (The Polymer Processing Society), Extended Abstracts and Final Programme, Gothenburg, Aug. 19-21, 1997, 4:13. In addition, subtracting GPC curves, when fractions of each polymer are known is possible.

Thus, although not directly measurable on the two-stage process products, the properties of the fractions produced in the second stage of such a two-stage process can be determined by applying either or both of the above methods. The skilled person will be able to select the appropriate method.

In a preferred embodiment, the HMW fraction is an ethylene copolymer which has preferably a density of at least 860 kg/m$^3$, a preferred density range being 890 to 920 kg/m$^3$.

If the process according to the invention comprises one or two additional polymerization steps, these steps are preferably performed in gas phase reactors, as described above.

Any combination of gas phase reactors can be used.

For example, the polymerization product of the second polymerization step, which is either a fluidized bed polymerization step or a fast fluidized bed polymerization step, preferably a fluidized bed polymerization step is transferred into a third polymerization reactor, which is for example a settled bed polymerization reactor. The product from the third polymerization step is optionally transferred into a fourth reaction step, which uses for example again a fluidized bed polymerization reactor. From the fourth reaction reactor the polymer is recovered and sent to further processing.

The use of two or three subsequent fluidized bed polymerization reactors is a further possibility.

In any embodiment it is possible to feed additional catalyst components into any of the reaction zones respectively polymerization step. However, it is preferred that the solid catalyst component is introduced into the prepolymerization step only and that no fresh solid catalyst component is added into any reaction zone respectively polymerization step. Thus, the solid catalyst component entering a polymerization step comes from the preceding polymerization step(s) only. However, additional cocatalyst and/or electron donor can be introduced into the reaction stages if necessary. This may be done, for instance, to increase the activity of the catalyst or to influence the isotacticity of the polymer.

As stated above, the final polymer can have a co-monomer content of up to 15 wt %. If the polymer is produced in a two-stage process, the amount of comonomer in the polymer produced in the second stage can be calculated based on the final amount present in the polymer, the amount in the polymer produced in the first stage and on the production split between the first and second stages.

The comonomers which can be employed in each stage in the present invention include $C_{3-12}$ alpha olefins, preferably selected from but-1-ene, hex-1-ene, 4-methyl-pent-1-ene, hept-1-ene, oct-1-ene, and dec-1-ene, more preferably but-1-ene and hex-1-ene. Preferably hexene or butene, or a mixture of hexene and butene is used.

The final LLDPE polymer produced according to the invention preferably has a $MFR_{21}$ of 1 to 15, preferably 1 to 10 g/10 min as measured according to ISO 1133 at 190° C. under a 21.6 kg load.

The weight average molecular weight of preferred final polymer is in the range 180 000 to 500 000, more preferably 250 000 to 350,000, as measured by gel permeation chromatography. The final LLDPE polymer has a molecular weight distribution below 20, preferably below 15 and more preferably below 10. The final MWD of the polymer produced by a multi-stage polymerization process is the result of the MW's produced in each stage.

The ethylene polymer produced by the method of the current invention preferably is a bimodal LLDPE, preferably having a density of 900 to 935 kg/m$^3$, more preferably 915 to 935 kg/m$^3$.

The bulk density of polymer powder, determined according to ASTM D1895-96, method A, of the LLDPE according to the invention is above 300 kg/m$^3$.

The polymer of the present invention may also comprise conventional additives such as antioxidants, UV stabilisers, acid scavengers, anti-blocking agents, polymer processing agent etc. The amounts of these compounds may be readily determined by those skilled in the art. These may be added to the polymer using conventional techniques.

The polymers produced according to the method of the present invention may be used to manufacture articles such as pipes.

Pipes may be made from the polymers produced according to the present invention by any conventional technique, e.g. extrusion. The inclusion of the LMW component in the polymer enhances processability, whilst the narrower MWD of the polymer as a whole (largely due to the avoidance of a low molecular weight tail on the HMW component) ensures that pipes can withstand high pressures.

The invention will now be described in more detail in the following non-limiting examples.

EXPERIMENTAL AND EXAMPLES

1. Definitions and Measurement Methods

Melt flow rates (MFR) are measured under a load of 5 kg and 21.6 kg and at 190° C. according to ISO 11333.

GPC: Molecular Weight Averages, Molecular Weight Distribution, and Polydispersity Index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2× GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

GPC-FTIR: Molecular Weight Distribution (MWD) and Short Chain Branching (SCB)

Molecular weight distribution (MWD) was determined by Gel Permeation Chromatography (GPC) according to ISO 16014-4:2003 and ASTM D 6474-99. A Waters GPC2000 instrument, equipped with heated flow cell (at 140° C.) connected via a heated transfer line (at 140° C.) was used with 2× Olexis and 1× Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a mercury cadmium telluride (MCT) detector. The MCT detector is cooled with liquid nitrogen. During the chromatographic run a series of FTIR spectra is collected using the Perkin Elmer TimeBase V3.0 software. The spectrometer settings were 16 accumulations, scan range from 3000 cm-1 to 2700 cm-1, resolution 8 cm-1. A background spectrum taken under GPC run conditions is substracted from each spectrum collected during the chromatographic run. 423.5 μL of sample solution were injected per analysis. The column set was calibrated using universal calibration (according to ISO 16014-2:2003) with at least 15 narrow MWD polystyrene (PS) standards in the range of 0.6 kg/mol to 6 000 kg/mol. Mark Houwink constants for PS, PE and PP used are as per ASTM D 6474-99. All samples were prepared by dissolving 4.0-8.0 mg of polymer in 4 mL (at 140° C.) of stabilized TCB (stabilized with 250 mg/L 2,6-Di tert butyl-4-methyl-phenol) and keeping for max. 3 hours at max 160° C. with continuously gentle shaking prior sampling into the GPC instrument. The spectral data as recorded by Perkin Elmer TimeBase 3.0 software is imported into Polymer Laboratories Cirrus V3.1 software and the evaluation towards molecular weights and molecular weight distribution was performed with this software.

The evaluation towards short chain branching was performed by applying a chemometric model using the Polymer Laboratories FTIR add on software for Cirrus. The model was generated as described in U.S. Pat. No. 6,632,680 and P. J. DesLauriers, D. C. Rohlfing, E. T. Hsieh; Polymer 2002, 43, 159-170. The short chain branching was determined as methyl branching per 1000 total carbons and was corrected for 2 methyl chain end groups per polymer chain as described in above mentioned reference.

Density of the polymer was determined according to ISO 1183-1987 on compression-moulded specimens.

Bulk Density was determined according to ASTM D1895-96, method A, by filling a container with known volume (100 ml) with polymer powder and measuring the weight of polymer. Bulk density is calculated as kgPE/m$^3$ Comonomer contents (hexene and butene) were measured with Fourier transform infrared spectroscopy (FTIR) calibrated with $^{13}$C-NMR Elemental Analysis of the Catalysts The elemental analysis of the catalysts was performed by taking a solid sample of mass, M, cooling over dry ice. Samples were diluted up to a known volume, Vol, by dissolving in nitric acid (HNO$_3$, 65%, 5% of Vol) and freshly deionised (DI) water (95% of Vol), the samples were left to stabilise for two hours.

The analysis was run at room temperature using a Thermo Elemental IRIS Advantage XUV Inductively Coupled Plasma-Atomic Excitation Spectrometer (ICP-AES) which was calibrated immediately before analysis using a blank (a solution of 5% HNO$_3$ in DI water), a low standard (10 ppm Al in a solution of 5% HNO$_3$ in DI water, a high standard (100 ppm Mg, 50 ppm Al, 50 ppm Ti and 50 ppm V in a solution of 5% HNO$_3$ in DI water) and a quality control sample (50 ppm Mg, 20 ppm Al, 20 ppm Ti and 20 ppm V in a solution of 5% HNO$_3$ in DI water).

The content of aluminium was monitored via the 167.081 nm line, when Al concentration in ICP sample was between 0-10 ppm and via the 396.152 nm line for Al concentrations between 10-100 ppm. The magnesium concentration was monitored via the 285.213 nm line and the titanium content via the 323.452 nm line.

The content of vanadium was monitored using an average from the 292.402 nm and 310.230 nm lines.

The reported values, required to be between 0 and 100, or further dilution is required, are an average of three successive aliquots taken from the same sample and are related back to the original catalyst using equation 1.

$$C = (R \times \text{Vol})/M \qquad \text{Equation 1}$$

Where: C is the concentration in ppm, related to % content by a factor of 10,000

R is the reported value from the ICP-AES

Vol is the total volume of dilution in ml

M is the original mass of sample in g

If dilution was required then this also needs to be taken into account by multiplication of C by the dilution factor.

Example 1

Catalyst Preparation a) Preparation of the Mg-Alcoholate Complex

The Mg-alcoholate was prepared in a larger batch. About 24 kg of the Mg-alcoholate complex was produced. The Mg-alcoholate complex synthesis was started by adding 16.0 kg (472 g Mg, 19.42 mol Mg) of 20% heptane solution of $(C_4H_9)_{1.5}Mg(C_8H_{17})_{0.5}$ (BOMAG, 2.95% Mg) into a multi purpose reactor at room temperature. To this solution 4.92 kg (37.79 mol) of 2-ethyl-hexanol (EHA) was added slowly at room temperature. The Mg/EHA molar ratio in this mixture was 1:1.945. The temperature was held at about room temperature and the reactants were allowed to react with each other for 108 min. 3.75 kg (52.1 mol) of n-pentane was added at room temperature to reduce viscosity and the Mg-alcoholate complex was allowed to stabilise for 120 min at 20-30° C. After this the Mg-alcoholate solution was allowed to temperate back to room temperature. Analyses showed that the Mg-alcoholate complex had a concentration of 2.4% Mg.

b) Preparation of the $MgCl_2$ Support Material 25 ml of heptane ($C_7$) was first added to a 250 ml glass reactor. Then 38.2 g of a 20 w % pentane solution of EADC was added. Afterwards a Mg-complex solution, as prepared above, was added drop by drop with a syringe during 45 min into the reaction solution at room temperature in a molar proportion of 1:1 referring to EADC. The Mg/Al molar ratio in this mixture was about 2:1. After this the temperature was adjusted to 75° C. and the reactants were allowed to react with each other. After reaction, the precipitate was allowed to settle for 30 min and then the liquid was siphoned off and the support washed twice with heptane at 60° C. The wash solution was then siphoned off. The support-heptan slurry had a Mg content of 1.06 wt %.

Example 1

Catalyst A

Catalyst A was prepared by taking 10 g of the previously prepared support material into a vessel provided with a mixing device. In a separate vessel 0.06 ml of $VCl_4$ and 0.18 ml of $TiCl_4$ were mixed and then added in the vessel with the support in heptane. The Mg/(V+Ti) molar ratio was 2:1. The slurry was mixed over night at room temperature. After this the catalyst was separated from the heptane liquid and washed twice with 5 ml portions of heptane and then dried for one hour under a stream of nitrogen.

Comparative Example 1

Catalyst B

The catalyst B was prepared by taking 10 g of the previously prepared support material into a vessel provided with a mixing device. 0.24 ml of $TiCl_4$ was added to the vessel with the support slurry. The Mg/Ti molar ratio was 2:1. The slurry was mixed for four hours at room temperature. After this the catalyst was separated from the heptane liquid and washed twice with 5 ml portions of heptane and then dried for one hour under a stream of nitrogen.

Example 2

Slurry Polymerization

Polymerization of ethylene to produce the LMW component (batch slurry polymerization)

A 5 liter autoclave reactor was used. 1300 g of propane was introduced into the reactor as reaction medium. 27.3 bar of $H_2$ pressure was added from 560 ml feed vessel into the reactor. The temperature of the reactor system was set to 85° C. and the catalyst (prepared according to the method described above) and the co-catalyst were fed into the reactor by means of two feed vessels that were connected in line to the reactor lid. Catalyst A was added into the upper feed vessel together with 3 ml of pentane. The co-catalyst (TIBA) was added to the lower feed vessel with Al/Ti molar ratio of 10 mol/mol. The catalyst and co-catalyst were added into the reactor by automatic feeding system utilising propane flush. The polymerization was started by opening the ethylene feed line through the premixing chamber. Target ethylene partial pressure was 3.5 bar. A pressure of about 44.5 bar was maintained by the ethylene feed trough out the polymerization. The polymerization was carried out at 85° C. for 60 min after which it was stopped by venting off the monomer and propane. The amount of produced polymer in first stage was 207 g and it was estimated from the ethylene mass flow meter. Polymer properties after slurry polymerization are listed in table 1.

Comparative Example 2

Slurry Polymerization

Polymerization of ethylene to produce the LMW component (batch slurry polymerization).

A 5 liter autoclave reactor was used. 1300 g of propane was introduced into the reactor as reaction medium. 27.3 bar of $H_2$ pressure was added from 560 ml feed vessel into the reactor. The temperature of the reactor system was set to 85° C. and the catalyst (prepared according to the method described above) and the co-catalyst were fed into the reactor by means of two feed vessels that were connected in line to the reactor lid. Catalyst B was added into the upper feed vessel together with 3 ml of pentane. The co-catalyst (TIBA) was added to the lower feed vessel with Al/Ti molar ratio of 10 mol/mol. The catalyst and co-catalyst were added into the reactor by automatic feeding system utilising propane flush. The polymerization was started by opening the ethylene feed line through the premixing chamber. Target ethylene partial pressure was 3.5 bar. A pressure of about 44.5 bar was maintained by the ethylene feed trough out the polymerization. The polymerization was carried out at 85° C. for 60 min after which it was stopped by venting off the monomer and propane. The amount of produced polymer in first stage was 187 g. Polymer properties after slurry polymerization are listed in table 1.

TABLE 1

Polymer properties after slurry polymerization

|  | Example 2 | Comparative example 2 |
|---|---|---|
| Catalyst | A | B |
| Catalyst amount (mg) | 31.8 | 21.1 |
| Yield (g) | 207 | 187 |
| Activity (kg/gCat/h) | 6.51 | 8.86 |
| Mn | 5 670 | 9240 |
| Mw | 48 500 | 61200 |
| MWD | 8.5 | 6.6 |
| Bulk Density (kg/m$^3$) | 328 | 334 |
| Density (kg/m$^3$) | 969 | 970.4 |
| Comonomer Content (wt %) | 0 | 0 |
| MFR 2 (g/10 min) | 30.3 | 22.7 |
| MFR 5 (g/10 min) | 92.1 | 71.4 |
| MFR 21.6 (g/10 min) | 1010 | 802.1 |

Example 3

Two-stage Polymerization with Catalyst A a) First Stage: Polymerization of Ethylene to Produce the LMW Component (Batch Slurry Polymerization):

A 5 liter autoclave reactor was used. 1300 g of propane was introduced into the reactor as reaction medium. 27.4 bar of $H_2$ pressure was added from 560 ml feed vessel into the reactor. The temperature of the reactor system was set to 85° C. and the catalyst (prepared according to the method described above) and the co-catalyst were fed into the reactor by means of two feed vessels that were connected in line to the reactor lid. About 40 mg of catalyst A was added into the upper feed vessel together with 3 ml of pentane. The co-catalyst (TIBA) was added to the lower feed vessel with Al/Ti molar ratio of 10 mol/mol. The catalyst and co-catalyst were added into the reactor by automatic feeding system utilising propane flush. The polymerization was started by opening the ethylene feed line through a premixing chamber. Target ethylene partial pressure was 3.5 bar. A pressure of about 43.6 bar was maintained by the ethylene feed trough out the polymerization. The polymerization was carried out at 85° C. for 30 min after which it was stopped by venting off the monomer and propane. The amount of produced polymer in first stage was 134 g and it was estimated from the ethylene mass flow meter.

b) Second Stage: Ethylene-hexene Co-polymerization to Produce the HMW Component.

The second stage in the polymerization was carried out in the same 5 l autoclave reactor as described above containing the previously prepared homo-polymer. After venting off the medium, hydrogen and monomer from the first stage, the reactor and polymer was purged with nitrogen 3 times. Then approximately 28.1 bar of nitrogen was introduced into the reactor as fluidizing medium. The hexene ($C_6$") co-monomer feed was set to follow monomer feed (13 wt %) from ethylene feed. At 85° C. the polymerization and data collection was started again. Partial pressure of ethylene was 2 bar. A pressure of about 30.1 bar was maintained by the ethylene feed trough out the test polymerization. The co-polymerization was continued for 150 minutes. The polymerization was stopped by venting off the monomer, comonomer and nitrogen. The total yield of polymer was 282 g (148 g produced in GP). More detailed results from these polymerizations are listed in Table 2.

Example 4

Two-stage Polymerization with Catalyst A a) First Stage: Polymerization of Ethylene to Produce the LMW Component (Batch Slurry Polymerization):

A 5 liter autoclave reactor was used. 1300 g of propane was introduced into the reactor as reaction medium. 27.3 bar of $H_2$ pressure was added from 560 ml feed vessel into the reactor. The temperature of the reactor system was set to 85° C. and the catalyst (prepared according to the method described above) and the co-catalyst were fed into the reactor by means of two feed vessels that were connected in line to the reactor lid. About 32.8 mg of catalyst A was added into the upper feed vessel together with 3 ml of pentane. The co-catalyst (TIBA) was added to the lower feed vessel with Al/Ti molar ratio of 10 mol/mol. The catalyst and co-catalyst were added into the reactor by automatic feeding system utilising propane flush. The polymerization was started by opening the ethylene feed line through the premixing chamber. Target ethylene partial pressure was 3.5 bar. A pressure of about 44.9 bar was maintained by the ethylene feed trough out the polymerization. The polymerization was carried out at 85° C. for 30 min after which it was stopped by venting off the monomer and propane. The amount of produced polymer in first stage was 164 g and it was estimated from the ethylene mass flow meter.

b) Second Stage: Ethylene-hexene Co-polymerization to Produce the HMW Component:

The second stage in the polymerization was carried out in the same 5 l autoclave reactor as described above containing the previously prepared homo-polymer. After venting off the medium, hydrogen and monomer from the first stage, the reactor and polymer was purged with nitrogen 3 times. Then approximately 28 bar of nitrogen was introduced into the reactor as fluidizing medium. The hexene ($C_6$") co-monomer feed was set to follow monomer feed (13 wt %) from ethylene feed. At 85° C. the polymerization and data collection was started again. Partial pressure of ethylene was 3 bar. A pressure of about 31 bar was maintained by the ethylene feed trough out the test polymerization. The co-polymerization was continued for 120 minutes. The polymerization was stopped by venting off the monomer, comonomer and nitrogen. The total yield of polymer was 447 g (283 g produced in GP). More detailed results from these polymerizations are listed in Table 2.

Comparative Example 3

Two-stage Polymerization with Catalyst B a) First Stage: Polymerization of Ethylene to Produce the LMW Component (Batch Slurry Polymerization):

A 5 liter autoclave reactor was used. 1300 g of propane was introduced into the reactor as reaction medium. 27.1 bar of $H_2$ pressure was added from 560 ml feed vessel into the reactor. The temperature of the reactor system was set to 85° C. and the catalyst (prepared according to the method described above) and the co-catalyst were fed into the reactor by means of two feed vessels that were connected in line to the reactor lid. About 20 mg of catalyst B was added into the upper feed vessel together with 3 ml of pentane. The co-catalyst (TIBA) was added to the lower feed vessel with Al/Ti molar ratio of 20 mol/mol. The catalyst and co-catalyst were added into the reactor by automatic feeding system utilising propane flush. The polymerization was started by opening the ethylene feed line through the premixing chamber. Target ethylene partial pressure was 3.5 bar. A pressure of about 44.1 bar was maintained by the ethylene feed trough out the polymerization. The polymerization was carried out at 85° C. for 60 min after which it was stopped by venting off the monomer and propane. The amount of produced polymer in first stage was 127 g and it was estimated from the ethylene mass flow meter.

b) Second Stage: Ethylene-hexene Co-polymerization to Produce the HMW Component:

The second stage in the polymerization was carried out in the same 5 l autoclave reactor as described above containing the previously prepared homo-polymer. After venting off the medium, hydrogen and monomer from the first stage, the reactor and polymer was purged with nitrogen 3 times. Then approximately 28 bar of nitrogen was introduced into the reactor as fluidizing medium. The hexene ($C_6$") co-monomer feed was set to follow monomer feed (13 wt %) from ethylene feed. At 85° C. the polymerization and data collection was started again. Partial pressure of ethylene was 2 bar. A pressure of about 30 bar was maintained by the ethylene feed trough out the test polymerization. The co-polymerization was continued for 120 minutes. The polymerization was stopped by venting off the monomer, comonomer and nitrogen. The total yield of polymer was 367 g (240 g produced in GP). More detailed results from these polymerizations are listed in Table 2.

TABLE 2

Results of two-stage polymerizations

| BIMODAL SLURRY/ GPR | EXAMPLE 3 | EXAMPLE 4 | COMPARATIVE EXAMPLE 3 |
|---|---|---|---|
| Slurry (1st stage) | | | |
| Co-catalyst | TIBA | TIBA | TIBA |
| Al/Ti mol/mol | 10 | 10 | 20 |
| Time (min) | 30 | 30 | 60 |
| Yield of ethylene | 134 | 164 | 127 |
| GPR (2nd stage) | | | |
| Time (min) | 150 | 120 | 120 |
| Yield of polymer (g) | 282 | 447 | 367 |
| MFR$_{21}$ [g/10 min] (final) | 3.5 | 1.9 | 15.3 |
| Mw (final) | 283 000 | 319 000 | 177 000 |
| Mn (final) | 32 800 | 36 600 | 15 400 |
| MWD (final) | 8.6 | 8.7 | 11.5 |
| C$_6$ [wt %] (final) | 6.8 | 7.1 | 6.0 |
| Density [kg/m$^3$] (final) | 931 | 924 | 937 |
| Bulk density [kg/m$^3$] (final) | 324 | 380 | 219 |
| Calculated properties | | | |
| Calculated yield of polymer in GPR (g) | 148 | 283 | 240 |
| Slurry fraction [wt %] | 47 | 37 | 35 |
| GPR fraction [wt %] | 53 | 63 | 65 |
| Calc. comonomer content in polymer produced in GPR (wt %) | 14.3 | 19.4 | 17.3 |
| Calc. C$_6$ conversion (%) (2nd stage) | 74 | 53 | 55 |
| Calc. Density GPR (kg/m$^3$) | 897 | 897 | 919 |

[1]
Calculated comonomer content in polymer produced in GPR = (100/GPR fraction [wt %]) × C$_6$ [wt %] (final))
[2]
Calc. C$_6$ conversion (%) (2$^{nd}$ stage) = [(Calc. comonomer content in polymer produced in GPR)/100] × [Polymer amount (2$^{nd}$ stage)]/C$_6$ consumption (g)
[3]
Calc. Density GPR (kg/m$^3$) = {[Density [kg/m$^3$] (final)] − [Slurry fraction [wt %]/100 × Density (kg/m$^3$) slurry]}/[GPR fraction [wt %]/100]; Density (kg/m$^3$) slurry = 969 kg/m$^3$ (see table 1)

From table 2 it can be seen that with catalyst A, a copolymer with a narrower MWD, compared to copolymers produced with comparative catalyst B, without Vanadium, is produced.

Comparative catalyst (catalyst B, Comparative Example 3) produced a polymer in the gas phase having 17.3 wt % comonomer content, which contributed the polymer density of 919 kg/m$^3$ for this polymer produced in the gas phase. When this is compared to Example 4, it can be seen that a catalyst containing titanium and vanadium contributes extremely low density despite only 2 wt % higher comonomer content. And when comparing to Example 3, with even lower comonomer content (14.3 wt %) compared to Comparative Example 3 it was able to contribute density decrease down to 897. This indicates that with the same comonomer content, a catalyst containing titanium and vanadium is able to polymerize comonomer more effectively, thus being able to contribute better into polymer density.

So comparing the properties of the polymer fractions made in the gas phase it can be seen that using catalyst A with approximately the same amount of comonomer incorporated, a lower density in the gas phase was achieved, which is a clear indication of a better comonomer composition distribution.

In the drawing, the molecular weight distribution and corresponding comonomer content at different molecular weight for the two-stage polymerization with catalyst B of Comparative Example 3 are shown in dotted lines. The molecular weight distribution and corresponding comonomer content at different molecular weights for the two-stage polymerization with catalyst A of Example 3 are shown in solid lines. From the drawing (GPC and GPC-FTIR obtained during bimodal polymerization; Example 3 and Comparative Example 3) it can be seen that a copolymer having a high molecular tail and a narrower MWD, compared to copolymers produced with comparative catalyst B, without Vanadium, is produced. From the drawinq, it can also be seen that the comonomer content (CH3-/l OOO total C) in the HMW component tend to be clearly higher with catalyst A having vanadium component than with catalyst B with 100% of titanium, which also indicates a better comonomer incorporation behavior.

The invention claimed is:

1. Multi-stage polymerization process for the production of a multi-modal linear low density polyethylene in at least two staged reactors connected in series comprising at least
   (i) polymerizing in a first slurry phase stage ethylene monomers and optionally one or more alpha-olefine comonomers, in the presence of a Ziegler-Natta polymerization catalyst system to obtain a first polyethylene fraction component (A)
   (ii) polymerizing in a second gas or slurry phase stage ethylene monomers and one or more alpha-olefine comonomers, in the presence of a Ziegler-Natta polymerization catalyst system to obtain a second polyethylene fraction component (B),
   one of fraction component (A) or (B) being the lower molecular weight component of the linear low density polyethylene, the other being the higher molecular weight component of the linear low density polyethylene,
   wherein the second polymerization step is carried out in the presence of the polymerization product of the first polymerization step,
   whereby the Ziegler-Natta polymerization catalyst system comprises
1) a solid procatalyst formed by contacting at least:
   a) a Mg-alcoholate complex of the formula (I):
      Mg(OR$_1$)$_{2-n}$(R$_1$)$_n$, wherein each R$_1$ independently represents a C$_1$-C$_{20}$ hydrocarbyl group and 0≦n<2 and may or may not be an integer;
   b) an aluminum compound of the formula (II)
      Al(R$_2$)$_m$X$_{3-m}$, wherein each R$_2$ independently represents an alkyl of up to 6 carbon atoms; each X is independently a halogen; 0≦m<3 and m and may or may not be an integer
   c) a vanadium compound and a titanium compound in portions such as to provide a molar ratio of V:Ti from 10:90 to 90:10
   in order to yield the solid procatalyst and
2) one or more organometallic cocatalyst(s) of the formula (III)

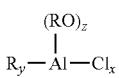

wherein each R is independently a C$_1$-C$_{20}$-alkyl group, 0≦x≦2; 1≦y≦3; 0≦z≦2 and x+y+z=3; x, y and z may or may not be an integer,
   yielding a multi-modal linear low density polyethylene with a narrow molecular weight distribution, measured with GPC, below 20, a density according to ISO 1183 of 900 to 935 kg/m³, an $MFR_{21}$ according to ISO 1133 (190° C., 21.6 kg load) of 1 to 15 g/10 min and a $C_3$-$C_{12}$-comonomer content of 1 to 15 wt %, whereby the linear low density polyethylene shows an improved comonomer composition distribution compared to linear low density polyethylene produced with multi-stage processes using Ziegler-Natta catalysts with 100% Ti.

2. Process according to claim 1, wherein the polymerization process includes one or two additional polymerization steps, subsequent to the second polymerization step.

3. Process according to claim 2, wherein the one or two additional polymerization steps comprise gas phase polymerization stages.

4. Process according to claim 1, wherein the polymerization process is a two-stage process comprising
  (i) polymerizing in a first slurry phase stage ethylene monomers and optionally one or more alpha-olefine comonomers, in the presence of a Ziegler-Natta polymerization catalyst system to obtain a first polyethylene fraction component (A) and
  (ii) polymerizing in a second gas or slurry phase stage ethylene monomers and one or more alpha-olefine comonomers, in the presence of a Ziegler-Natta polymerization catalyst system to obtain a second polyethylene fraction component (B),
  one of fraction component (A) or (B) being the lower molecular weight component of the linear low density polyethylene, the other being the higher molecular weight component of the linear low density polyethylene,
  wherein the split (wt %/wt %) between the fraction component (A) and (B) is from 30/70 to 70/30.

5. Process according to claim 4, wherein faction component (A) produced in the first slurry phase stage is the lower molecular weight component of the linear low density polyethylene and faction component (B) produced in the second stage is the higher molecular weight component of the linear low density polyethylene.

6. Process according to claim 4, wherein the split (wt %/wt %) between the fraction component (A) and (B) is from 35/65 to 65/30.

7. Process according to claim 1, wherein the alpha-olefine comonomer is a $C_{3-12}$-alpha-olefine.

8. Process according to claim 7, wherein the comonomer is hex-1-ene or but-1-ene or a mixture of hexene and butene.

9. Process according to claim 1, wherein the solid procatalyst used in the process is prepared by contacting at least
  [A] a solid magnesium aluminum complex containing magnesium, halogen and aluminum, said complex being obtained by
    (a1)) adding a solution of a magnesium compound of the formula (I):
      $Mg(OR_l)_{2-n}(R_1)_n$, wherein each $R_1$ independently represents a $C_1$-$C_{20}$ hydrocarbyl group; and $0 \leq n < 2$ and may or may not be an integer;
      to a solution of a compound of formula (II):
      $Al(R_2)_m X_{3-m}$, wherein each $R_2$ independently represents an alkyl of up to 6 carbon atoms; each X is independently a halogen, $0 \leq m < 3$ and m may or may not be an integer,
    (a2) separating the solidified reaction product from the reaction mixture and washing the product with a wash solution until a molar ratio of aluminum to magnesium has a value of at least 0.3 and
  [B] with a vanadium compound and a titanium compound in portions such as to provide a molar ratio of V:Ti from 10:90 to 90:10 in order to yield the procatalyst.

10. Process according to claim 1, wherein the quantity of vanadium and titanium compound which are employed to prepare the procatalyst is such that the molar ratio of V:Ti is from 25:75 to 75:25.

11. Process according to claim 1, wherein the organometallic cocatalyst of the formula (III) is added together with the procatalyst only in a preceding prepolymerization step or into the first polymerization step, or additional organometallic cocatalyst of the formula (III) is also added in one or more of the subsequent polymerization steps.

12. Process according to claim 1, wherein the final multimodal linear low density polyethylene has a narrow molecular weight distribution, measured with GPC, below 10, a weight average molecular weight, measured with GPC, of 180 000 to 500 000, and a bulk density of the polymer powder, determined according to ASTM D1895-96, method A, of above 300 kg/m³.

13. A polymer obtained by the process as claimed in claim 1.

14. A process for manufacturing an article, comprising: extruding the polymer of claim 13.

15. The polymer of claim 13, wherein polymer has a density of from 900 to 931 g/cm³.

16. The polymer of claim 13, wherein polymer has a density of from 900 to 924 g/cm³.

17. The polymer of claim 13, wherein polymer has a density of from 900 to 915 g/cm³.

18. The process of claim 14, wherein the article is a pipe.

19. The article manufactured according to the process of claim 14.

* * * * *